(12) United States Patent
Kobayashi et al.

(10) Patent No.: US 7,169,961 B2
(45) Date of Patent: Jan. 30, 2007

(54) PROCESS FOR PRODUCING LOW POLYMER OF α-OLEFIN

(75) Inventors: Ryoichi Kobayashi, Chiba (JP); Shigeki Kura, Chiba (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 225 days.

(21) Appl. No.: 10/487,728

(22) PCT Filed: Aug. 21, 2002

(86) PCT No.: PCT/JP02/08413

§ 371 (c)(1),
(2), (4) Date: Feb. 25, 2004

(87) PCT Pub. No.: WO03/020772

PCT Pub. Date: Mar. 13, 2003

(65) Prior Publication Data

US 2004/0199037 A1  Oct. 7, 2004

(30) Foreign Application Priority Data

Aug. 28, 2001 (JP) .............................. 2001-257257

(51) Int. Cl.
C07C 2/06 (2006.01)
(52) U.S. Cl. .................. 585/502; 585/510; 585/901
(58) Field of Classification Search ................ 585/502, 585/510, 901
See application file for complete search history.

(56) References Cited

U.S. PATENT DOCUMENTS 6,576,721 B2   6/2003  Kobayashi et al.
6,660,814 B1  12/2003  Kroener et al.

FOREIGN PATENT DOCUMENTS

JP  3-220135  9/1991
JP  10-7593   1/1998

(Continued)

OTHER PUBLICATIONS

U.S. Appl. No. 10/257,537, filed Oct. 15, 2002, Kobayashi et al.

(Continued)

*Primary Examiner*—Thuan D Dang
(74) *Attorney, Agent, or Firm*—Oblon, Spivak, McClelland, Maier & Neustadt, P.C.

(57) ABSTRACT

A process for producing an α-olefin oligomer by oligomerization of an α-olefin in a presence of a Ziegler-based catalyst, the process comprising introducing at least a portion of a reaction product which is taken out of a reactor and has a temperature of 115° C. or higher into an external heat exchanger, cooling the introduced reaction product, maintaining an oligomerization solution taken out of the external heat exchanger at a temperature of 110° C. or higher and returning at least a portion of the oligomerization solution to the reactor. In the production of an α-olefin oligomer, precipitation and adhesion of polymers at the inside of manufacturing apparatuses such as the external heat exchanger and troubles caused thereby can be prevented and a stable continuous operation can be continued for a long time.

13 Claims, 1 Drawing Sheet

FOREIGN PATENT DOCUMENTS

| | | |
|---|---|---|
| JP | 10-7594 | 1/1998 |
| JP | 10-7595 | 1/1998 |
| JP | 10-8149 | 1/1998 |
| JP | 10-45833 | 2/1998 |
| WO | WO 00/15646 * | 3/2000 |

OTHER PUBLICATIONS

U.S. Appl. No. 10/489,611, filed Mar. 22, 04, Kobayashi et al.
Patent Abstracts of China, CN1184819, Jun. 17, 1998 (corresponding to US 6,660,814 B1).

* cited by examiner

PROCESS FOR PRODUCING LOW POLYMER OF α-OLEFIN

TECHNICAL FIELD

The present invention relates to a process for producing an α-olefin oligomer and, more particularly, to a process for producing an α-olefin oligomer useful as the raw material for high polymers, plasticizers and surfactants while the generated heat is removed by using an external heat exchanger, wherein troubles caused by precipitation of polymers in the externally circulating heat exchanger is prevented and a stable continuous operation can be continued for a long time.

BACKGROUND ART

α-Olefin oligomers having a double bond and 4 to 24 carbon atoms are useful substances widely used as monomer materials for olefinic polymers, comonomers for various high polymers and materials for plasticizers and surfactants. The α-olefin oligomers are produced, in general, by oligomerization of α-olefins used as the raw materials in the presence of a Ziegler-based catalyst. Since the oligomerization of an α-olefin is an exothermic reaction, it is necessary that the oligomerization be conducted while the generated heat is suitably removed when a continuous operation is conducted in the industrial scale. Examples of the process for removing the generated heat include the process comprising cooling by using a jacket of the reactor and the process comprising forming a circulating flow route from the reactor to an external heat exchanger and then back to the reactor and removing the generated heat in the external heat exchanger (hereinafter, this process will be occasionally referred to as the externally circulating heat exchanger process).

On the other hand, it is inevitable in the oligomerization that a considerable amount of polymers are formed as byproducts. The polymers formed as byproducts occasionally cause problems in the production in that the polymers adhere to the reactor and other apparatuses for the production and the apparatuses are clogged.

Among the above processes for removing the generated heat, the externally circulating heat exchanger process is more frequently used since a greater heat transfer area can be obtained. When this process is used, the above problem of precipitation of polymers inside the heat exchanger and clogging of the circulating line of the apparatuses frequently arises.

DISCLOSURE OF THE INVENTION

As described above, it has been desired that, when the heat generated by the reaction is removed in accordance with the externally circulating heat exchanger process in the oligomerization of an α-olefin in the presence of a Ziegler-based catalyst, precipitation of polymers in apparatuses for the production such as the external heat exchanger and troubles caused thereby are prevented and a stable continuous operation can be conducted for a long time. The present invention has been made to overcome the above problem.

The present invention has an object of providing a process for producing an α-olefin oligomer in accordance with which precipitation and adhesion of polymers in apparatuses for the production such as an external heat exchanger and troubles caused thereby can be prevented and the stable continuous operation can be continued for a long time.

As the result of the intensive studies by the present inventors to achieve the above object, it was found that, in the oligomerization of an α-olefin in accordance with the externally circulating heat exchanger process, the above object can be achieved by maintaining the temperatures of the oligomerization solution at the outlet of the reactor connected to the circulation route and at the outlet of the external heat exchanger within each specific range. The present invention has been completed based on this knowledge.

The present invention provides a process for producing an α-olefin oligomer by oligomerization of an α-olefin in a presence of a Ziegler-based catalyst, the process comprising introducing at least a portion of a reaction product which is taken out of a reactor and has a temperature of 115° C. or higher is introduced into an external heat exchanger, cooling the introduced reaction product, maintaining an oligomerization solution taken out of the external heat exchanger at a temperature of 110° C. or higher and returning at least a portion of the oligomerization solution to the reactor.

THE MOST PREFERRED EMBODIMENT TO CARRY OUT THE INVENTION

Figure 1:
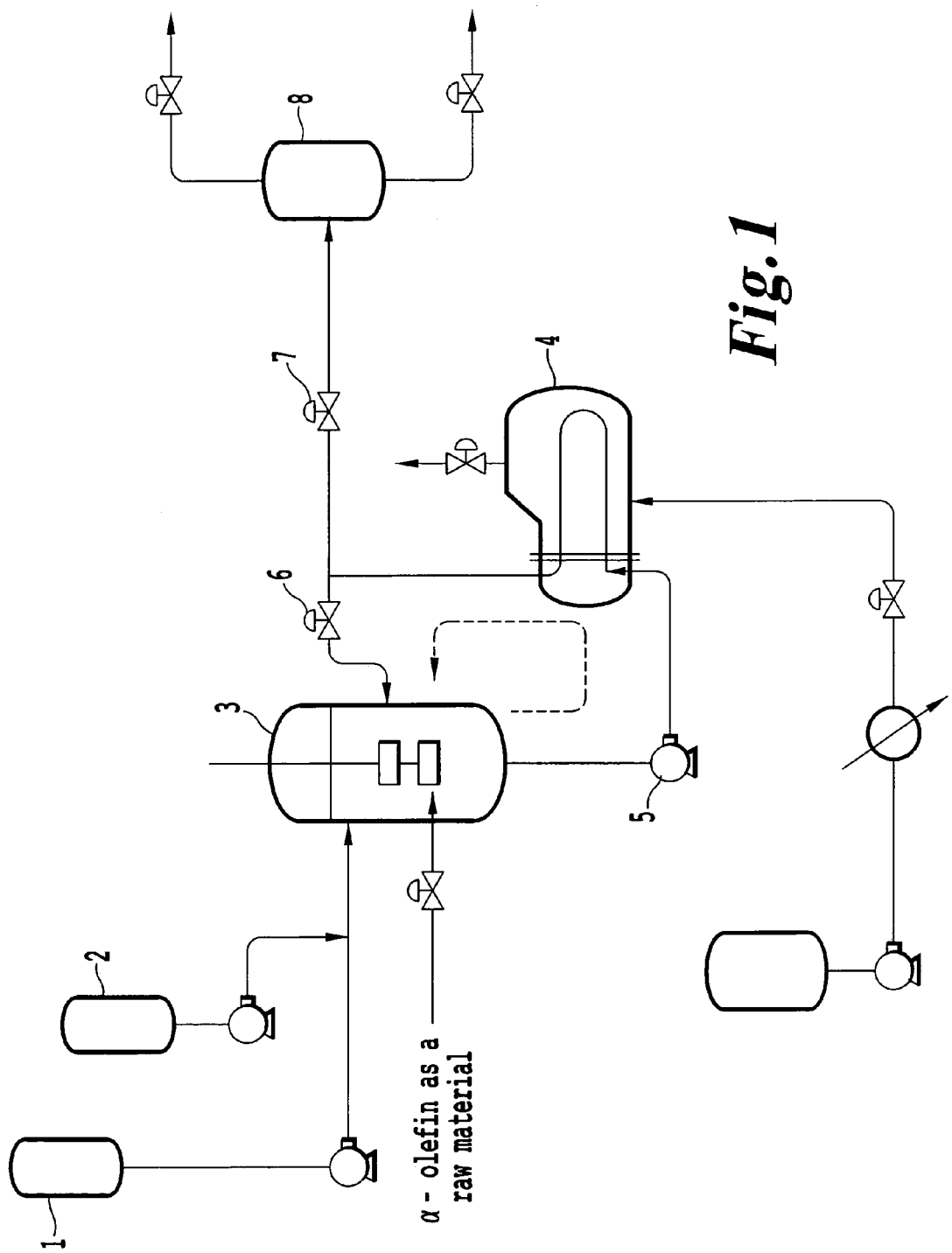
FIG. 1 shows a schematic process diagram exhibiting an embodiment of the apparatus for conducting the process of the present invention.

The present invention will be described in more detail in the following.

In the present invention, the α-olefin oligomer is obtained by oligomerization of an α-olefin in the presence of a Ziegler-based catalyst. The Ziegler-based catalyst comprises a combination of (A) a transition metal compound, (B) an organoaluminum compound and (C) a third component which is used where desired. As the transition metal compound of component (A), a compound represented by the following general formula (I) is used.

$$MX_xY_yO_z \tag{I}$$

[in the above formula, M represents zirconium atom or titanium atom, X represents a halogen atom (chlorine atom, bromine atom or iodine atom), Y represents RO—, R$_2$N—, —OCOR, —OSO$_3$R, R—, -Cp (cyclopentadienyl) (R representing a linear or branched alkyl group having 1 to 20 carbon atoms) or a β-diketonate represented by formula (II):

(II)

(in formula (II), R$^1$, R$^2$ and R$^3$ each independently representing hydrogen atom, an alkyl group having 1 to 20 carbon atoms or an alkyl group having 1 to 20 carbon atoms and substituted with a halogen atom and one of R$^1$, R$^2$ and R$^3$ representing an alkyl group having 1 to 20 carbon atoms and substituted with a halogen atom), x, y and z represents an integer of 0 to 4 and x+y+z=4]. Specific examples of the above compound include $ZrCl_4$, $ZrBr_4$, $ZrI_4$, $ZrBrCl_3$, $ZrBr_2Cl_2$, $TiCl_4$, $TiBr_4$, $TiI_4$, $TiBrCl_3$, $TiBr_2Cl_2$, $Zr(OC_2H_5)_4$, $Zr(OC_2H_5)_2Cl_2$, $Zr(O\text{-}n\text{-}C_3H_7)_4$, $Zr(O\text{-}n\text{-}C_3H_7)_2Cl_2$, $Zr(O\text{-}iso\text{-}C_3H_7)_4$, $Zr(O\text{-}iso\text{-}C_3H_7)_2Cl_2$, $Zr(O\text{-}n\text{-}C_4H_9)_4$, $Zr(O\text{-}n\text{-}C_4H_9)_2Cl_2$, $Zr(O\text{-}iso\text{-}C_4H_9)_4$, $Zr(O\text{-}iso\text{-}C_4H_9)_2Cl_2$, $Zr(O\text{-}tert\text{-}C_4H_9)_4$, $Zr(O\text{-}tert\text{-}C_4H_9)_2Cl_2$, $Zr((CH_3)_2N)_4$, $Zr((C_2H_5)_2N)_4$, $Zr((n\text{-}C_3H_7)_2N)_4$, $Zr((iso\text{-}C_3H_7)_2N)_4$, $Zr((n\text{-}C_4H_9)_2N)_4$, $Zr((tert\text{-}C_4H_9)_2N)_4$, $Zr(OSO_3CH_3)_4$, $Zr(OSO_3C_2H_5)_4$, $Zr(OSO_3C_3H_7)_4$, $Zr(OSO_3C_4H_9)_4$, $ZrCp_2ClBr$, $Ti(OC_2H_5)_4$, $Ti(OC_2H_5)_2Cl_2$, $Ti(O\text{-}n\text{-}C_3H_7)_4$, $Ti(O\text{-}n\text{-}C_3H_7)_2Cl_2$, $Ti(O\text{-}iso\text{-}C_3H_7)_4$, $Ti(O\text{-}iso\text{-}C_3H_7)_2Cl_2$, $Ti(O\text{-}n\text{-}C_4H_9)_4$, $Ti(O\text{-}n\text{-}C_4H_9)_2Cl_2$, $Ti(O\text{-}iso\text{-}C_4H_9)_4$, $Ti(O\text{-}iso\text{-}C_4H_9)_2Cl_2$, $Ti(O\text{-}tert\text{-}C_4H_9)_4$, $Ti(O\text{-}tert\text{-}C_4H_9)_2Cl_2$, $Ti((CH_3)_2N)_4$, $Ti((C_2H_5)_2N)_4$, $Ti((n\text{-}C_3H_7)_2N)_4$, $Ti((iso\text{-}C_3H_7)_2N)_4$, $Ti((n\text{-}C_4H_9)_2N)_4$, $Ti((tert\text{-}C_4H_9)_2N)_4$, $Ti(OSO_3CH_3)_4$, $Ti(OSO_3C_2H_5)_4$, $Ti(OSO_3C_3H_7)_4$, $Ti(OSO_3C_4H_9)_4$, $TiCp_2ClBr$, $Zr(OCOC_2H_5)_4$, $Zr(OCOC_2H_5)_2Cl_2$, $Zr(OCOC_3H_7)_4$, $Zr(OCOC_3H_7)_2Cl_2$, $Zr(OCOC_3H_7)_4$, $Zr(OCOC_3H_7)_2Cl_2$, $Zr(OCOC_4H_9)_4$, $Zr(OCOC_4H_9)_2Cl_2$, $Ti(OCOC_2H_5)_4$, $Ti(OCOC_2H_5)_2Cl_2$, $Ti(OCOC_3H_7)_4$, $Ti(OCOC_3H_7)_2Cl_2$, $Ti(OCOC_3H_7)_4$, $Ti(OCOC_3H_7)_2Cl_2$, $Ti(OCOC_4H_9)_4$, $Ti(OCOC_4H_9)_2Cl_2$, $ZrCl_2(HCOCFCOF)_2$ and $ZrCl_2(CH_3COCFCOCH_3)_2$. Examples of the organoaluminum compound of component (B) include compounds represented by the following general formula:

$$AlY_aX_bO_cN_d \qquad (III)$$

[in the above formula, X represents a halogen atom (chlorine atom, bromine atom or iodine atom), Y represents RO—, $R_2N$—, —OCOR or R— (R representing a linear or branched alkyl group having 1 to 20 carbon atoms), a, b, c and d each represent an integer of 0 to 3 and a+b+c+d=3] and/or a compound represented by the following general formula:

$$Al_2Y_{a'}X_{b'}O_{c'}N_{d'} \qquad (IV)$$

[in the above formula, X represents a halogen atom (chlorine atom, bromine atom or iodine atom), Y represents RO—, $R_2N$—, —OCOR, —RCOCR' COR" or R— (R, R' and R" each representing a linear or branched alkyl group having 1 to 20 carbon atoms), a', b', c' and d' each represent an integer of 0 to 6 and a'+b'+c'+d'=6].

Examples of the compound represented by general formula (III) include $Al(CH_3)_3$, $Al(C_2H_5)_3$, $Al(C_3H_7)_3$, $Al(iso\text{-}C_3H_7)_3$, $Al(C_4H_9)_3$, $Al(iso\text{-}C_4H_9)_3$, $Al(C_5H_{11})_3$, $Al(C_6H_{13})_3$, $Al(C_8H_{17})_3$, $Al(C_2H_5)_2Cl$, $Al(C_2H_5)_2Br$, $Al(C_2H_5)_2I$, $Al(C_2H_5)Cl_2$, $Al(C_2H_5)Br_2$, $Al(C_2H_5)I_2$, $AlC_2H_5(OC_2H_5)_2$, $AlC_2H_5(OC_3H_7)_2$, $AlC_2H_5(OC_4H_9)_2$, $Al(OC_2H_5)_2Cl$, $Al(OC_3H_7)_2Cl$, $Al(OC_4H_9)_2Cl$, $Al(OC_2H_5)Cl_2$, $Al(OC_3H_7)Cl_2$, $Al(OC_4H_9)Cl_2$, $AlC_2H_5(OCOC_2H_5)_2$, $AlC_2H_5(OCOC_3H_7)_2$, $AlC_2H_5(OCOC_4H_9)_2$, $Al(OCOC_2H_5)Cl$, $Al(OCOC_3H_7)_2Cl$, $Al(OCOC_4H_9)_2Cl$, $Al(OCOC_2H_5)Cl_2$, $Al(OCOC_3H_7)Cl_2$, $Al(OCOC_4H_9)Cl_2$, $Al(C_2H_5)_2OC_2H_5$, $Al(C_2H_5)_2OC_3H_7$, $Al(C_2H_5)_2OC_4H_9$, $Al(C_2H_5)_2N(C_2H_5)_2$, $Al(C_2H_5)_2N(C_3H_7)_2$ and $Al(C_2H_5)_2N(C_4H_9)_2$. Examples of the compound represented by general formula (IV) include $Al_2(CH_3)_3Cl_3$, $Al_2(CH_3)_3Br_3$, $Al_2(C_2H_5)_3Cl_3$, $Al_2(C_2H)_3Br_3$, $Al_2(C_2H_5)_3I_3$, $Al_2(C_2H_5)_2BrCl_2$, $Al_2(C_3H_7)_3Cl_3$, $Al2(iso\text{-}C_3H_7)_3Cl_3$, $Al_2(C_4H_9)_3Cl_3$, $Al_2(iso\text{-}C_4H_9)_3Cl_3$, $Al_2(C_5H_{11})_3Cl_3$, $Al_2(C_8H_{17})_3Cl_3$, $Al_2(C_2H_5)_2(CH_3)Cl_3$, $Al_2(OC_2H_5)_3Cl_3$, $Al_2(OC_3H_7)_3Cl_3$, $Al_2(OC_4H_9)_3Cl_3$, $Al_2(OCOC_2H_5)_3Cl_3$, $Al_2(OCOC_3H_7)_3Cl_3$ and $Al_2(OCOC_4H_9)_3Cl_3$.

As the third component of component (C) used where desired, at least one compound selected from sulfur compounds, phosphorus compounds and nitrogen compounds can be used. The third component contributes to the improvement in the quality of the α-olefin oligomer of the product.

The sulfur compound is not particularly limited as long as the sulfur compound is an organosulfur compound. For example, thioethers such as dimethyl sulfide, diethyl sulfide, dipropyl sulfide, dihexyl sulfide, dicyclohexyl sulfide and diphenyl thioether; dialkyl sulfide compounds such as dimethyl disulfide, diethyl disulfide, dipropyl disulfide, dibutyl disulfide, dihexyl disulfide, dicyclohexyl disulfide and ethyl methyl disulfide; thiophenes such as thiophene, 2-methylthiophene, 3-methylthiophene, 2,3-dimethylthiophene, 2-ethylthiophene and benzo-thiophene; heterocyclic sulfur compounds such as tetrahydrothiophene and thiopyran; aromatic sulfur compounds such as diphenyl sulfur, diphenyl disulfide, methyl phenyl disulfide and methyl phenyl sulfur; thiourea; and sulfides such as methyl sulfide, ethyl sulfide and butyl sulfide; are preferably used.

The phosphorus compound is not particularly limited as long as the phosphorus compound is an organophosphorus compound. For example, phosphines such as triphenylphosphine, triethylphosphine, tributyl-phosphine, tripropylphosphine, trioctylphosphine and tricyclohexyl-phosphine are preferably used.

The nitrogen compound is not particularly limited as long as the nitrogen compound is an organonitrogen compound. For example, organic amines such as methylamine, ethylamine, propylamine, butylamine, pentylamine, hexylamine, cyclohexylamine, octylamine, decylamine, aniline, benzylamine, naphthylamine, dimethylamine, diethylamine, dibutylamine, diphenylamine, methylphenylamine, trimethylamine, triethylamine, tributylamine, triphenylamine, pyridine and picoline are preferably used.

In the present invention, among the above sulfur compounds, phosphorus compounds and nitrogen compounds, one or more compounds selected, for example, from dimethyl disulfide, thiophene, thiourea, triphenylphosphine, tributylphosphine, trioctylphosphine and aniline are more preferably used.

The oligomerization of the α-olefin is conducted, in general, in an organic solvent. Examples of the organic solvent include naphthenic paraffins such as cyclohexane and decalin; aromatic hydrocarbons and aromatic hydrocarbons substituted with a halogen such as benzene, toluene, xylene, chlorobenzene, ethylbenzene, dichlorobenzene and chlorotoluene; aliphatic paraffins such as pentane, hexane, heptane, octane, nonane and decane; and haloalkanes such as dichloroethane and dichlorobutane.

In the present invention, the relative amounts of component (A), component (B), component (C) and the organic solvent described above as expressed by the amounts per 250 ml of the organic solvent are as follows. The amount of component (A) is, in general, 0.01 to 5 mmole and preferably 0.03 to 1 mmole. The amount of component (B) is, in general, 0.05 to 15 mmole and preferably 0.06 to 3 mmole. The amount of component (C) is, in general, 0.05 to 20 mmole and preferably 0.1 to 10 mmole when the sulfur compound described above is used as component (C) and 0.05 to 5 mmole when the nitrogen compound or the phosphorus compound is used as component (C).

As for the relative amounts of component (A) and component (B) described above, further advantageous results can be obtained when the ratio of the amount by mole of Al to the amount by mole of Zr or Ti is set in the range of 1 to 15.

The oligomerization of an α-olefin of the present invention is conducted at a temperature of 115 to 160° C. under a pressure of 2.94 to 8.82 MPa. The reaction time cannot be generally decided since the reaction time is different depending on the temperature and the pressure. The residence time in the reactor is about 10 to 60 minutes.

The α-olefin oligomer obtained in accordance with the process of the present invention comprises various types of oligomers having 4 or more carbon atoms and, more particularly, 4 to 18 carbon atoms. This ethylene oligomer is formed as a mixture of these oligomers.

In the process of the present invention, the externally circulating heat exchanger process in which a circulating flow route from the reactor to an external heat exchanger and then back to the reactor is formed and the generated heat is removed in the external heat exchanger is adopted to remove the heat generated by the above reaction. The externally circulating heat exchange process will be described with reference to FIG. 1 in the following.

FIG. 1 shows a schematic process diagram exhibiting an embodiment of the apparatus for conducting the process of the present invention. In FIG. 1, an organic solvent and a catalyst solution are supplied to a reactor 3 from an organic solvent tank 1 and a catalyst tank 2, respectively. To the reactor 3, an α-olefin as the raw material is supplied and the oligomerization is conducted under the condition described above. To the reactor, an external circulation system composed of an external heat exchanger 4, an external circulation pump 5 and a valve 6 is connected. After the oligomerization is conducted in a manner such that a prescribed residence time of the α-olefin used as the raw material is surely achieved in the presence of the catalyst and the solvent, the oligomerization solution is taken out of the reactor 3 by the external circulation pump 5 and transferred to the external heat exchanger 4. In the external heat exchanger 4, the heat is removed with a coolant such as water and steam and the temperature of the oligomerization solution is kept constant. The flow rate of the circulation is adjusted by suitably operating the valve 6 so that the temperature of the reaction solution at the outlet of the heat exchanger 4 is kept constant. The external heat exchanger which can be used in the present invention is not particularly limited. For example, a heat exchanger of the multi-tube type, a heat exchanger of the double tube-type or a heat exchanger of the spiral type can be used.

After the above oligomerization has been completed, for example, the oligomerization solution is transferred to a flasher 8 for degassing treatment so that the liquid level of the reactor 3 is kept constant by the valve 7.

The process of the present invention is characterized in that, for example, in the production apparatus described above, at least a portion of the oligomerization solution which is taken out of the reactor and has a temperature of 115° C. or higher is introduced into the external heat exchanger and cooled, the reaction product taken out of the external heat exchanger is kept at a temperature of 110° C. or higher and at least a portion of the reaction product is returned to the reactor.

By keeping the temperature of the oligomerization solution taken out of the external heat exchanger at 110° C. or higher, precipitation of polymers inside the external heat exchanger or the piping of the circulation system after the external heat exchanger can be effectively prevented. From this standpoint, it is preferable that the temperature of the oligomerization solution taken out of the external heat exchanger is kept in the range of 115 to 155° C. In the present invention, to keep the oligomerization solution at the above temperature and to prevent formation of local cold spots in the heat exchanger, it is preferable that the temperature of the coolant for cooling the external heat exchanger is 95° C. or higher at the inlet of the external heat exchanger.

In the present invention, by keeping the temperature of the oligomerization solution taken out of the reactor at 115° C. or higher, the precipitation of polymers inside the external heat exchanger or the piping of the circulation system after the external heat exchanger can be more effectively prevented. From the standpoint, it is preferable that the temperature of the above reaction product taken out of the reactor is in the range of 120 to 160° C.

In the present invention, the α-olefin used as the raw material is an α-olefin having 2 to 4 carbon atoms and preferably ethylene. The obtained α-olefin oligomer comprises various types of α-olefin oligomers having 4 or more carbon atoms and preferably 4 to 18 carbon atoms. Specific examples of the α-olefin oligomer include 1-butene, 1-hexene, 1-octene, 1-decene, 1-dodecene, 1-tetradecene, 1-hexadecene and 1-octadecene. The α-olefin oligomer is formed as a mixture of these oligomers. p In general, the oligomerization of the α-olefin is conducted in an organic solvent. Examples of the organic solvent include naphthenic paraffins such as cyclohexane and decalin; aromatic hydrocarbons and aromatic hydrocarbons substituted with a halogen such as benzene, toluene, xylene, chiorobeuzene, ethylbenzene, dichlorobenzene and chiorotoluene; aliphatic paraffins such as pentane, hexane, heptane, octane, nonane and decane; and haloalkanes such as dichioroethane and dichiorobutane.

In the present invention, the reaction solution obtained by the oligomerization of the α-olefin is then treated for recovery of the unreacted α-olefin, deactivation of the catalyst and deashing. For these treatments, it is preferable that the reaction product solution obtained after the oligomerization has been completed is kept at 90° C. or higher. The temperature is, in general, in the range of 90 to 160° C. and preferably in the range of 100 to 130° C. although the temperature is not particularly limited as long as the temperature is 90° C. or higher. An excessively high temperature is not preferable since the purity of the product occasionally decreases.

The amount of the polymers formed as byproducts varies depending on the reaction condition. The amount is, in general, in the range of 300 to 500 ppm. When the temperature of the reaction product solution is kept at 90° C. or higher, the polymers are dissolved and the stable operation can be continued independently of the type of the organic solvent used for the oligomerization.

After the treatment by distillation, the α-olefin oligomer of the object compound of the present invention can be obtained as a mixture product of desired various α-olefin oligomers. The α-olefin oligomer having the desired number of carbon atoms can be obtained in a greater amount in the mixture product by suitably selecting the reaction condition.

In accordance with the process for producing an α-olefin oligomer of the present invention, precipitation and adhesion of polymers in apparatuses for the production such as the external heat exchanger and troubles caused thereby can be prevented and the stable continuous operation can be conducted for a long time.

The present invention will be described more specifically with reference to examples in the following. However, the present invention is not limited to the examples.

EXAMPLE 1

The following production of an α-olefin oligomer was conducted using an apparatus similar to the apparatus shown in FIG. 1.

[Preparation of a Catalyst]

Into a 5-liter pot equipped with a stirrer, 250 mmole of anhydrous zirconium tetrachloride and 2.5 liters of dried cyclohexane were introduced under the atmosphere of argon and the resultant mixture was stirred for 10 minutes at the room temperature. To the mixture, triethylaluminum [$(C_2H_5)_3Al$] was added and, thereafter, ethylaluminum sesquichloride [$(C_2H_5)_3Al_2Cl_3$] was added. The amounts of triethylaluminum and ethylaluminum sesquichloride were adjusted so that the relative amounts of the catalyst components were: $(C_2H_5)_3Al/(C_2H_5)_3Al_2Cl_3=3.5$ as the ratio by mole and $[(C_2H)_3Al_2Cl_3+(C_2H_5)_3Al]/ZrCl_4=7$ as the ratio by mole. When the addition of all components was completed, the resultant mixture was heated at 70° C. for 2 hours under stirring. Thus, a complex is formed and a catalyst solution was prepared. The prepared catalyst solution was diluted with dried cyclohexane to a concentration of 1/100 of the original concentration. The diluted catalyst solution was placed into catalyst tank 2.

[Oligomerization of an α-Olefin]

The oligomerization was conducted continuously using a reactor 3 of the complete mixing tank type (an inner volume of 200 liters) to which an external circulation system for removal of heat shown in FIG. 1 was attached.

To the reactor 3 equipped with a stirrer having a two stage structure in which the upper portion has inclined paddle blades and the lower portion has turbine blades, cyclohexane as the solvent was introduced from an organic solvent tank 1 via a pump at a rate of 62 liters/hour and the catalyst solution diluted with cyclohexane was introduced from a catalyst tank 2 at a rate of 8 liters/hour. When the liquid level in the organic solvent tank 1 or the catalyst tank 2 is lowered, cyclohexane or the catalyst solution, respectively, was suitably added.

The oligomerization was conducted while ethylene gas of a high purity was continuously supplied to the liquid phase in the reactor 3 in a manner such that the reaction pressure was maintained at 6.4 MPa and the reaction mixture was stirred by the above stirrer at a speed of 200 revolutions/minute. Using a multi-tube heat exchanger 4 (heat transfer area: 10 m$^2$) of the shell-and-tube type in the external circulation system for removal of heat, the heat generated by the reaction was removed by formation of steam from water at 100° C. supplied under a pressure and the temperature of the reactor was kept constant at 130° C. The flow rate of circulation was controlled by a valve 6 in a manner such the temperature at the outlet of the external heat exchanger 4 was kept constant at 125° C. The reaction solution was transferred to a flasher 8 by operating a valve 7 so that the liquid level of the reactor was kept constant at 60 liters. The residence time of the reaction solution in the reactor 3 was kept at about 50 minutes based on the solvent (cyclohexane).

In the above reaction, the continuos operation could be conducted for 720 hours. The apparatus was opened after completion of the continuous operation and the adhesion of polymers was examined. Almost no polymer scales were found in the external circulation system and on the inner wall of tubes of the heat exchanger.

EXAMPLE 2

The reaction was conducted under the same condition as that in Example 1 except that the reaction temperature was adjusted at 120° C. and the temperature at the outlet of the external circulating heat exchanger was adjusted at 115° C. The same result as that in Example 1 was obtained.

EXAMPLE 3

The reaction was conducted under the same condition as that in Example 1 except that water at 90° C. was supplied to the exchanger 4 in place of water at 100° C. supplied in Example 2. The continuous operation could be conducted for 720 hours. The apparatus was opened after completion of the continuous operation and the adhesion of polymers was examined. Slight adhesion of polymers was found on the inner wall of tubes of the heat exchanger although no adhesion was found in the external circulation line.

COMPARATIVE EXAMPLE 1

The reaction was conducted under the same condition as that in Example 1 except that the reaction temperature was adjusted at 110° C. and the temperature at the outlet of the external circulating heat exchanger was adjusted at 105° C. In about 300 hours after the start of the operation, the operation could not be continued since the line was clogged by the precipitates of polymers adhered to the circulating line and on the inner wall of tubes of the heat exchanger.

COMPARATIVE EXAMPLE 2

The reaction was conducted under the same condition as that in Comparative Example 1 except that the reaction temperature was adjusted at 120° C. In about 450 hours after the start of the operation, the operation could not be continued since the line was clogged by the precipitates of polymers adhered to the circulating line and on the inner wall of tubes of the heat exchanger.

The results of Examples and Comparative Examples are summarized in Table 1 in the following.

TABLE 1

|  | Example | | | Comparative Example | |
| --- | --- | --- | --- | --- | --- |
|  | 1 | 2 | 3 | 1 | 2 |
| Reaction temperature (° C.) | 130 | 120 | 120 | 110 | 120 |
| Temperature at outlet of heat exchanger (° C.) | 125 | 115 | 115 | 105 | 105 |
| Temperature of coolant at inlet of heat exchanger (° C.) | 100 | 100 | 90 | 100 | 100 |
| Flow rate of circulation (m$^3$) | 5.9 | 6.2 | 6.2 | 6.5 | 2.2 |
| Polymer scale* |  |  |  |  |  |
| circulating line | good | good | good | poor | poor |
| heat exchanger | good | good | fair | poor | poor |
| Time of continuous operation (hour) | 720 or longer | 720 or longer | 720 or longer | about 300 | about 450 |

*good: Continuous operation for 720 hours possible and no adhesion of polymers
fair: Continuous operation for 720 hours possible and slight adhesion of polymers
poor: Continuous operation for 720 hours not possible due to adhesion of polymers

INDUSTRIAL APPLICABILITY

The present invention relates to a process for producing an α-olefin oligomer and, more particularly, to a process for producing an α-olefin oligomer useful as the raw material for high polymers, plasticizers and surfactants while the generated heat is removed by using an external heat exchanger, wherein troubles caused by precipitation of polymers in the external heat exchanger is prevented and a stable continuous operation can be continued for a long time.

The invention claimed is:

1. A process for producing an α-olefin oligomer by oligomerization of an α-olefin in a presence of a Ziegler-based catalyst, comprising:
   oligomerizing an α-olefin in a reactor containing a Ziegler-based catalyst to produce an oligomer reaction product and recovering the oligomer reaction product therefrom, of which a portion has a temperature of 115° C. or higher and is directed into an external heat exchanger;
   cooling the portion of the oligomer reaction product introduced into the external heat exchanger to produce an oligomerization solution;
   removing the oligomerization solution from the external heat exchanger at a temperature of 110° C. or higher, which temperature is maintained; and
   returning a portion of the temperature maintained oligomerization solution to the reactor.

2. The process according to claim 1, wherein the temperature of the reaction product withdrawn from the reactor is in the range of 120 to 160° C.

3. A process according to claim 1, wherein said external heat exchanger recquires a coolant, the temperature of which for the external heat exchanger is 95° C. or higher at an inlet of the external heat exchanger.

4. The process according to claim 1, wherein the α-olefin is ethylene.

5. The process according to claim 1, wherein the α-olefin oligomer is an oligomer having 4 to 18 carbon atoms.

6. The process according to claim 1, wherein the oligomerizing in the reactor is conducted at a temperature ranging from 115 to 160° C.

7. The process according to claim 1, wherein the oligomerizing in the reactor is conducted at a pressure of 2.94 to 8.82 MPa.

8. The process according to claim 1, wherein the oligomerizing is conducted in a solvent selected from the group consisting of naplithenic paraffins, aromatic hydrocarbons, aromatic hydrocarbons substituted with a halogen, aliphatic paraffins and haloalkanes.

9. The process according to claim 1, wherein the Ziegler-based catalyst comprises a combination of (A) a transition metal compound having formula (I) below, (B) an organoaluminum compound and optionally (C) a third component $$MX_xY_yO_z \quad (I)$$

wherein M represents zirconium or titanium, X represents halogen, Y represents RO—, $R_2N$—, —OCOR, —$OSO_3R$, R—, -Cp (cyclopentadienyl), R represents a linear or branched alkyl group having 1 to 20 carbon atoms or a β-diketonate having formula (II):

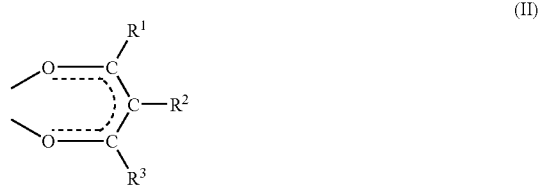

wherein $R^1$, $R^2$ and $R^3$ each independently represents hydrogen, alkyl having 1 to 20 carbon atoms or alkyl having 1 to 20 carbon atoms and substituted with a halogen atom, and one of $R^1$, $R^2$ and $R^3$ represents an alkyl group having 1 to 20 carbon atoms, optionally substituted by halogen, and x, y and z each represents an integer of 0 to 4 and x+y+z=4.

10. The process according to claim 9, wherein transition metal compound (A) is selected from the group consisting of $ZrCl_4$, $ZrBr_4$, $ZrI_4$, $ZrBrCl_3$, $ZrBr_2Cl_2$, $TiCl_4$, $TiBr_4$, $TiI_4$, $TiBrCl_3$, $TiBr_2Cl_2$, $Zr(OC_2H_5)_4$, $Zr(OC_2H_5)_2Cl_2$, $Zr(O-n-C_3H_7)_4$, $Zr(O-n-C_3H_7)_2Cl_2$, $Zr(O-iso-C_3H_7)_4$, $Zr(O-iso-C_3H_7)_2C_2$, $Zr(O-n-C_4H_9)_4$, $Zr(O-n-C_4H_9)_2C_2$, $Zr(O-iso-C_4H_9)_4$, $Zr(O-iso-C_4H_9)_2C_2$, $Zr(O-tert-C_4H_9)_4$, $Zr(O-tertC_4H_9)_2Cl_2$, $Zr((CH_3)_2N)_4$, $Zr((C_2H_5)_2N)_4$, $Zr((n-C_3H_7)_2N)_4$, $Zr((iso-C_3H_7)_2N)_4$, $Zr((n-C_4H_9)_2N)_4$, $Zr((tert-C_4H_9)_2N)_4$, $Zr(OSO_3CH_3)_4$, $Zr(OSO_3C_2H_5)_4$, $Zr(OSO_3C_4H_9)_4$, $ZrCp_2Cl_2$, $ZrCp_2ClBr$, $Ti(OC_2H_5)_4$, $Ti(OC_2H_5)_2Cl_2$, $Ti(O-n-C_3H_7)_4$, $Ti(O-n-C_3H_7)_2Cl_2$, $Ti(O-iso-C_3H_7)_4$, $Ti(O-iso-C_3H_7)_2C_2$, $Ti(O-n-C_4H_9)_4$, $Ti(O-n-C_4H_9)_2$, $Ti(O-iso-C_4H_9)_4$, $Ti(O-iso-C_4H_9)_2C_2$, $Ti(O-tert-C_4H_9)_4$, $Ti(O-tert-C_4H_9)_2C_2$, $Ti((CH_3)_2N)_4$, $Ti((C_2H_5)_2N)_4$, $Ti((n-C_3H_7)_2N)_4$, $Ti((iso-C_3H_7)_2N)_4$, $Ti((n-C_4H_9)_2N)_4$, $Ti((tert-C_4H_9)_2N)_4$, $Ti(OSO_3CH_3)_4$, $Ti(OSO_3C_2H_5)_4$, $Ti(OSO_3C_3H_7)_4$, $Ti(OSO_3C_4H_9)_4$, $TiCp_2Cl_2$, $TiCp_2ClBr$, $Zr(OCOC_2H_5)_4$, $Zr(OCOC_2H_5)_2C_2$, $Zr(OCOC_3H_7)_4$, $Zr(OCOC_3H_7)_2Cl_2$, $Zr(OCOC_3H_7)_4$, $Zr(OCOC_3H_7)_2C_2$, $Zr(OCOC_4H_9)_4$, $Zr(OCOC_4H_9)_2Cl_2$, $Ti(OCOC_2H_5)_4$, $Ti(OCOC_2H_5)_2Cl_2$, $Ti(OCOC_3H_7)_4$, $Ti(OCOC_3H_7)_2Cl_2$, $Ti(OCOC_3H_7)_4$, $Ti(OCOC_3H_7)_2Cl_2$, $Ti(OCOC_4H_9)_4$, $Ti(OCOC_4H_9)_2Cl_2$, $ZrC_2(HCOCFCOF)_2$ and $ZrCl_2(CH_3COCFCOCH_3)_2$.

11. The process according to claim 9, wherein the organoaluminum compound of component (B) is a compound represented by formula:

$$AlY_aX_bO_cN_d \quad (III)$$

wherein X represents halogen, Y represents RO—, $R_2N$—, —OCOR or R, wherein R is a linear or branched alkyl group having 1 to 20 carbon atoms, a, b, c and d each represent an integer of 0 to 3 and a+b+c+d=3 and/or a compound represented by formula:

$$Al_2Y_{a'}X_{b'}O_{c'}N_{d'} \quad (IV)$$

wherein X represents halogen, Y represents RO—, $R_2N$—, —OCOR, —RCOCR'COR" or R, wherein R, R' and R" each represents a linear or branched alkyl group having 1 to 20 carbon atoms, a', b', c' and d' each represents an integer of 0 to 6 and a'+b'+c'+d'=6.

12. The process according to claim 11, wherein the organoaluminum compound of formula (III) is a member selected from the group consisting of $Al(CH_3)_3$, $Al(C_2H_5)_3$, $Al(C_3H_7)_3$, $Al(iso-C_3H_7)_3$, $Al(C_4H_9)_3$, $Al(iso-C_4H_9)_3$, $Al(iso-C_4H_9)_3$, $Al(C_5H_{11})_3$, $Al(C_6H_{13})_3$, $Al(C_8H_{17})_3$, $Al(C_2H_5)_2Cl$, $Al(C_2H_5)_2Br$, $Al(C_2H_5)_2I$, $Al(C_2H_5)Cl_2$, $Al(C_2H_5)Br_2$, $Al(C_2H_5)I_2$, $AlC_2H_5(OC_2H_5)_2$, $AlC_2H_5(OC_3H_7)_2$, $AlC_2H_5$ $(OC_4H_5)_2$, $Al(OC_2H_5)_2Cl$, $Al(OC_3H_7)_2Cl$, $Al(OC_4H_9)_2Cl$, $Al(OC_2H_5)Cl_2$, $Al(OC_3H_7)Cl_2$, $Al(OC_4H_9)Cl_2$, $AlC_2H_5(OCOC_2H_5)_2$, $AlC_2H_5(OCOC_3H_7)_2$, $AlC_2H_5(OCOC_4H_9)_2$, $Al(OCOC_2H_5)_2Cl$, $Al(OCOC_3H_7)_2Cl$, $Al(OCOC_4H_9)_2Cl$, $Al(OCOC_2H_5)Cl_2$, $AL(OCOC_3H_7)Cl_2$, $Al(OCOC_4H_9)Cl_2$, $Al(C_2H_5)_2OC_2H_5$, $Al(C_2H_5)_2OC_3H_7$, $Al(C_2H_5)_2OC_4H_9$, $Al(C_2H_5)_2N(C_2H_5)_2$, $Al(C_2H_5)_2N(C_3H_7)_2$ and $Al(C_2H_5)_2N(C_4H_9)_2$.

13. The process according to claim 11, wherein the organoaluminum compound of formula (IV) is a member selected from the group consisting of $Al_2(CH_3)_3Cl_3$, $Al_2(CH_3)_3Br_3$, $Al_2(C_2H_5)_3Cl_3$, $Al_2(C_2H_5)_3Br_3$, $Al_2(C_2H_5)_3I_3$, $Al_2(C_2H_5)_2BrCl_2$, $Al_2(C_3H_7)_3Cl_3$, $Al_2(iso\text{-}C_3H_7)_3Cl_3$, $Al_2(C_4H_9)_3Cl_3$, $Al_2(iso\text{-}C_4H_9)_3Cl_3$, $Al_2(C_5H_{11})_3Cl_3$, $Al_2(C_8H_{17})_3Cl_3$, $Al_2(C_2H_5)_2(CH_3)Cl_3$, $Al_2(OC_2H_5)_3Cl_3$, $AL_2(OC_3H_7)_3Cl_3$, $Al_2(OC_4H_9)_3Cl_3$, $Al_2(OCOC_2H_5)_3Cl_3$, $Al_2(OCOC_3H_7)_3Cl_3$ and $Al_2(OCOC_4H_9)_3Cl_3$.

* * * * *

UNITED STATES PATENT AND TRADEMARK OFFICE
CERTIFICATE OF CORRECTION

PATENT NO. : 7,169,961 B2
APPLICATION NO. : 10/487728
DATED : January 30, 2007
INVENTOR(S) : Kobayashi et al.

It is certified that error appears in the above-identified patent and that said Letters Patent is hereby corrected as shown below:

On the title page, Item (73), the assignee information is incorrect. Item (73) should read:

Insert Item
-- (73)   Assignee:   Idemitsu Kosan Co., Ltd.,
                      Tokyo (JP) --

Signed and Sealed this

Ninth Day of October, 2007

JON W. DUDAS
*Director of the United States Patent and Trademark Office*